United States Patent
Schmitz

(10) Patent No.: US 10,767,877 B2
(45) Date of Patent: Sep. 8, 2020

(54) FILTER ASSEMBLY FOR VENTILATION SYSTEMS, DECENTRALIZED LIVING SPACE VENTILATION SYSTEM COMPRISING A FILTER ASSEMBLY OF THIS TYPE AND VENTILATION UNIT

(71) Applicant: Oliver Schmitz, Mönchengladbach (DE)

(72) Inventor: Oliver Schmitz, Mönchengladbach (DE)

(*) Notice: Subject to any disclaimer, the term of this patent is extended or adjusted under 35 U.S.C. 154(b) by 0 days.

(21) Appl. No.: 16/068,733

(22) PCT Filed: Jan. 14, 2017

(86) PCT No.: PCT/DE2017/100020
§ 371 (c)(1),
(2) Date: Jul. 9, 2018

(87) PCT Pub. No.: WO2017/121429
PCT Pub. Date: Jul. 20, 2017

(65) Prior Publication Data
US 2019/0024913 A1    Jan. 24, 2019

(30) Foreign Application Priority Data
Jan. 14, 2016    (DE) .................. 10 2016 100 551

(51) Int. Cl.
*F25B 29/00*    (2006.01)
*F24F 3/16*    (2006.01)
(Continued)

(52) U.S. Cl.
CPC ............. *F24F 3/166* (2013.01); *F24F 7/00* (2013.01); *F24F 12/001* (2013.01); *F24F 13/28* (2013.01);
(Continued)

(58) Field of Classification Search
CPC .. F24F 3/166; F24F 7/00; F24F 12/001; F24F 13/28; F24F 2003/1635; F24F 2003/1682;
(Continued)

(56) References Cited

U.S. PATENT DOCUMENTS 4,948,362 A * 8/1990 Baird ...................... C04B 33/32
                                                         110/254
5,165,466 A    11/1992 Arbabian
(Continued)

FOREIGN PATENT DOCUMENTS

CN    102095312 A    6/2011
CN    204583478 U    8/2015
(Continued)

OTHER PUBLICATIONS

English Abstract of WO 2004106812.
(Continued)

*Primary Examiner* — Davis D Hwu
(74) *Attorney, Agent, or Firm* — Cahn & Samuels, LLP

(57) ABSTRACT

A ventilation unit for decentralised room ventilation systems, in which unit at least one reversible fan and a heat reservoir element are supplemented by an electrostatic precipitator for air purification. In addition, a filter assembly is provided for a ventilation system, in particular for a decentralised room ventilation system, having an air duct with an electrostatic precipitator through which an air stream to be purified is forced, with the precipitator extending over a predetermined section of the air duct. The filter assembly has, in the predetermined electrostatic-precipitator section of the air duct, at least one heat reservoir element impinged by the air stream, the electrostatic precipitator and the heat reservoir element thus being spatially restricted relative to one another.

13 Claims, 3 Drawing Sheets

(51) Int. Cl.
*F24F 13/28* (2006.01)
*F24F 7/00* (2006.01)
*F24F 12/00* (2006.01)

(52) U.S. Cl.
CPC ............... *F24F 2003/1635* (2013.01); *F24F 2003/1682* (2013.01); *F24F 2007/003* (2013.01); *F24F 2012/008* (2013.01); *Y02A 50/21* (2018.01); *Y02B 30/563* (2013.01)

(58) Field of Classification Search
CPC .......... F24F 2007/003; F24F 2012/008; Y02A 50/21; Y02B 30/563; F24T 10/13; C04B 33/32
USPC ........................................................ 165/252
See application file for complete search history.

(56) References Cited

U.S. PATENT DOCUMENTS

| | | | | |
|---|---|---|---|---|
| 5,441,682 A | * | 8/1995 | Baker | ............... B32B 5/26 |
| | | | | 257/E39.018 |
| 6,607,702 B1 | * | 8/2003 | Kang | ................... A61L 9/16 |
| | | | | 422/186.3 |
| 2018/0224215 A1 | * | 8/2018 | Thiers | ................. F24T 10/13 |

FOREIGN PATENT DOCUMENTS

| | | |
|---|---|---|
| DE | 202012103631 U1 | 1/2013 |
| KR | 1020130024589 A | 3/2013 |
| WO | 2004106812 A1 | 12/2004 |

OTHER PUBLICATIONS

English Abstract of CN 102095312.
English Abstract of DE 202012103631.
English Abstract of KR 20130024589.
English Abstract of CN 204583478.
Written Opinion of the International Searching Authority, dated May 29, 2017.

* cited by examiner

FILTER ASSEMBLY FOR VENTILATION SYSTEMS, DECENTRALIZED LIVING SPACE VENTILATION SYSTEM COMPRISING A FILTER ASSEMBLY OF THIS TYPE AND VENTILATION UNIT

This application claims priority to PCT Application DE/2017/100020 filed on Jan. 14, 2017, which claims priority to patent application DE 10 2016 100 551.7, filed on January, 2016, the entirety of each of which is herein incorporated by reference.

The present invention relates to a filter assembly for a ventilation system, in particular for a decentralized living space ventilation system, a decentralized living space ventilation system having such a filter assembly and a ventilation unit, in particular for decentralized living space ventilation systems.

Controlled living space ventilation systems constitute a key component for the frictionless operation of buildings which are configured in an energy-efficient and largely air-tight fashion. The quality of the living space air can be maintained by using controlled living space ventilation systems, wherein the heat losses which otherwise occur with natural ventilation by means of windows are minimized. As a result, the air humidity is also kept to a controlled level, with the result that the formation of mold and other structural damage which are caused by moisture are avoided.

The term "living space" is to be understood in this context as meaning that the air quality is to be improved for the presence of persons. Such systems can also be used, for example, for office spaces, with the result that the term "living space ventilation system" is not intended to signify any restriction to use in terms of residential construction.

In commercial terms, a differentiation is made between centralized and decentralized living space ventilation systems.

Recently, decentralized ventilation systems have become increasingly widespread in the field of residential construction in comparison with centralized living space ventilation systems.

This is attributable, on the one hand, to a tendentially lower production expenditure which means that these systems are also suitable for being installed subsequently in existing properties. A significant advantage of the decentralized systems is also that it is possible to dispense with air ducts leading to a central heat exchanger which are long or difficult to access or even inaccessible. This constitutes a great advantage in terms of maintenance and hygiene.

In order to minimize heat losses, with the decentralized living space ventilation systems as mentioned above generally a heat reservoir is provided which is heated by warm internal air which is conducted outward by means of reversing operation of the ventilation means in the ventilation mode, and then when the operating mode is reversed the inflowing, generally relatively cool external air is preheated. Therefore, in the known systems heat recovery rates of >80% are achieved.

In addition, in such living space ventilation systems in Germany filtering of at least the air which flows into the interior space is legally prescribed. This filtering usually occurs by means of filter mats or the like.

In the last few years it has been recognized that air particles with an aerodynamic diameter of 10 µm or less—so-called fine dust—can have serious effects on human health. When such fine dust particles are breathed in they pass into the upper airways or into the lungs and, under certain circumstances, from there into the bloodstream and can cause serious damage to the health of the body—depending on their shape and toxicity. In a current study the German Federal Environmental Office assumes that there are on average 47,000 premature deaths per year in Germany owing to fine dust pollution, e.g. as a result of acute respiratory illnesses or lung cancer. In many other large cities throughout the world, in particular in Asia, the situation is even more serious than in Germany.

Conventional filters, such as e.g. filter mats, are not very efficient in terms of their filter power, in particular in the case of relatively small particles, such as fine dusts, and certainly not if relatively large pressure losses are to be avoided. Furthermore, such filter media cannot be easily cleaned or have to be regularly renewed. If this is not done, on the one hand a hygiene problem arises, and on the other hand a filter which is "blocked" with particles results in high pressure losses and the effectiveness of the system drops.

An alternative to conventional filters are electrostatic precipitators or electrostatic filters (also referred to as arrangements for electronic dust precipitation) which are operated with high voltages of several kilovolts. In this context, the particles which are present in the air are precipitated by means of electrical charges.

In particular two-stage electrostatic precipitators according to the so-called Penney principle, are known for living space air purification. In this context, the particles which are to be precipitated are firstly electrically charged by means of a so-called ionizer. This is done by means of so-called corona discharges using thin corona wires which are generally positively charged and are arranged between negatively charged plates. The air with the charged particles then passes into a so-called collector which is composed of plates which are arranged in parallel with one another and are each of opposite charge. The charged particles are precipitated on the plates (in particular the negatively charged plates) with the result that the air after the plates is largely particle-free.

Electrostatic precipitators according to the Penney principle operate with low ozone and in a reliable fashion. However, such an electrostatic precipitator has a considerable overall length, on the one hand owing to the two-stage design and, on the other hand, owing to the required minimum distance which the air has to travel along through the collector for a particle precipitation to be able to take place with a good yield.

Since a typical decentralized ventilation system is arranged directly in a wall breakthrough, the available overall length is limited to the available wall thickness and it is desired to avoid internal or external structures which are not esthetically pleasing or impractical in terms of construction technology. Therefore, in conventional living space ventilation systems it already constitutes a technical requirement to accommodate the required components, inter alia fans, the conventional filter, heat reservoir for the recovery of heat etc. on the available overall length, in particular in the case of small wall thickness such as are prescribed, for example, when renovating existing housing stock.

A further aspect of electrostatic precipitators is their energy consumption. The power drain of typical electrostatic precipitators is not very high but owing to the conversion losses in high-voltage power supply units and owing to the continuously flowing discharge currents power drain values of the order of magnitude of approximately 10 W are necessary in the case of electrostatic precipitators in the living space field. In continuous operation and in view of the fact that in the case of decentralized living space ventilation systems a plurality of (at least two) units are generally to be provided, these power drain values are not negligible.

The present invention is accordingly based on the object of providing a filter assembly and a decentralized living space ventilation system with such a filter assembly and a ventilation unit which permit optimum fine dust filtering with compact design sizes and in an energy-efficient fashion.

The abovementioned object is achieved by means of a filter assembly having the features of patent claim 1, by means of a decentralized living space ventilation system having the features of patent claim 8 and by means of a ventilation unit having the features of patent claim 12.

Advantageous refinements of the invention are explained in the respective dependent patent claims.

In an inventive filter assembly for a ventilation system, in particular for a decentralized living space ventilation system, having an air duct which has an electrostatic precipitator through which the airstream which is to be purified is made to flow and which extends over a predefined section of the air duct, there is provision that the predefined electrostatic precipitator section of the air duct additionally has at least one heat reservoir element against which the airstream flows.

The present invention is suitable in particular for decentralized (living space) ventilation systems but can also be used for other ventilation systems in which there is a need for filtering when there is a simultaneous temperature difference between the two air sides, for example even in the case of centralized ventilation systems or vehicle air-conditioning systems, etc.

According to one aspect of the invention, electrostatic precipitators and heat reservoirs are combined. Although the components of conventional electrostatic precipitators naturally also have a certain inherent heat storage capacity, this capacity alone is generally much lower than that required to implement sufficient thermal capacity for the aimed-at heat recovery rates in the range from 80% to 90%. According to the invention the aim is also to provide additional heat reservoir elements whose heat storage capacity significantly exceeds the inherent heat storage capacity of the electrodes of an electrostatic precipitator (and the necessary attachments etc.).

The at least one heat reservoir element can—in contrast to the electrodes of the electrostatic precipitator—preferably be fabricated from an electrically insulating material or a material which is a poor electrical conductor.

In addition to sufficient specific heat capacity and sufficient heat exchange coefficients between heat exchangers and the airstream, a sufficient storage mass is necessary for effective heat recovery, which storage mass generally cannot be made available solely by the necessary components of the electrostatic precipitator. Therefore, in one preferred embodiment the heat reservoir elements can have an overall mass which is at least as large as 50%, preferably 100%, of the mass of the components which are technically necessary for the electrostatic precipitator.

In this way, according to the invention at least a significant part, preferably a large part, of the heat storage capacity of the assembly, typically 5% to 100%, particularly preferably 25% to 100%, is to be made available by the combined heat reservoir/filter unit. If appropriate, additional heat storage capacity can also be additionally made available by means of additional dedicated heat reservoirs which are positioned separately upstream or downstream of the filter assembly; and likewise it is also possible to use additional filters—such as e.g. conventional filters which are based on filter mats.

The additional heat storage capacity which is integrated into the filter can be provided, for example, by means of additional heat-storage elements which are arranged between the capacitor plates.

Alternatively or additionally, the capacitor plates, which are, of course, good conductors owing to their metallic character, can also be embodied in a particularly heat-storing fashion, but the transfer of heat by the precipitated particles is then adversely affected under certain circumstances. The latter measure is therefore preferably suitable for the positively charged capacitor plates, since the positively charged particles are precipitated on the negative plates of the collector during the positive pre-ionization of the particles which is preferred in the case of Penney discharges.

Overall, the at least one heat reservoir element and the electrostatic precipitator are preferably interleaved in one another in such a way that the axial extent of the electrostatic precipitator which is interleaved with the at least one heat reservoir element is smaller than the sum of the axial extents of a correspondingly powerful separate electrostatic precipitator and the axial extents of one or more correspondingly powerful separate heat reservoir elements.

This results in effective saving of overall length, with the result that the filter assembly according to the invention is particularly suitable for decentralized ventilation systems which were installed in wall breakthroughs and have a low wall thickness even if the use of the invention is not to be restricted thereto.

The electrostatic precipitator which is used for the filter assembly according to the invention is preferably embodied as a two-stage electrostatic precipitator with an ionizer and a collector according to the so-called Penney principle.

The at least one heat reservoir element can preferably be embodied in a comb-like fashion, wherein the individual teeth of the at least one comb-like element preferably project into the intermediate spaces between the collector electrodes of the electrostatic precipitator which are preferably in the form of plates. The space between the collector electrodes or collector plates is thus efficiently used. The field properties in the remaining spaces between the collector plates are improved, or at least not degraded, with respect to the particle precipitation in accordance with the dielectric properties of the heat-storing elements. The comb-like elements can be provided in partial areas of the collective plates or also extend in a plate-like fashion over relatively large areas between the collector plates, and this also is a question of aerodynamic optimization.

The at least one heat reservoir element is preferably manufactured essentially from a material with a high thermal conductance and high heat storage capacity which is preferably not electrically conductive, in particular from a plastic material or a ceramic material.

In addition, a decentralized living space ventilation system with a filter assembly as described above is proposed within the scope of the invention.

Connected upstream or downstream of the filter assembly is preferably at least one electric fan which is controlled by a controller and which is operated in a reversing fashion in a normal operating mode of the living space ventilation system, with the result that when there is a temperature difference between the inside and the outside heat recovery can be achieved with the at least one heat reservoir element.

The electrostatic precipitator is preferably embodied for filtering primarily the air flowing into an interior space in an inflow air operating mode, and the electrostatic precipitator, in particular the ionizer, is preferably supplied with voltage only in an inflow air operating mode of the living space ventilation system and is switched off in an outflow air operating mode.

As a result, a significant saving in energy can be achieved, since, in comparison with continuous operation, the electrostatic precipitator typically only requires energy in 50% of the operating time if a 50% portion of the external air supply is assumed. If the decentralized living space ventilation system is not operational in specific situations—e.g. if this is not necessary owing to the signal of a pollutant sensor or $CO_2$ sensor owing to the quality of the inside air, the electrostatic precipitator can also be switched off automatically.

Against this background, a possible alternative basic description of the present invention also consists in providing a ventilation system with at least one fan with reverse operation and optional heat reservoir with an electrostatic precipitator which is operated with complete precipitation power only in one operating direction of the at least one fan.

Furthermore, in one embodiment, the controller can have a purification mode which is actuated periodically and/or can be actuated manually and in which, when the electrostatic precipitator is switched off, air is blown outward with a maximum power and therefore deposited dust particles are removed as far as possible.

Alternatively or additionally, an actuator (e.g. a vibrator or a beater) can be provided which causes or facilitates removal of deposited dust particles.

In one preferred embodiment, the operating voltage of the electrostatic filter, including the operating voltage of the ionizer and the operating voltage of the collector, can be varied as a function of various parameters, wherein these parameters can be selected from the group of the air feed direction, the air throughput rate, the operating level, the calendar date and the time, the internal temperature, the external temperature, the location-dependent fine dust values which are transmitted via a network, the air humidity, a predefinition for the prevailing average particle size (country mode/town mode) as well as the signal of a particle sensor and/or a signal of a dust resistance sensor. This results in a variety of possibilities for individual adaptation to the respective operating conditions. For example, the power drain of the electrostatic filter can be reduced or eliminated if the particle sensor indicates only a low particle load of the external air or this can be determined on the basis of weather data or from a network (e.g. Internet). A so-called dust resistance sensor supplies information about the specific resistance of the dust particles to be removed and permits the operating parameters of the electrostatic precipitator to be optimized. In addition, the current air humidity can also be used for the control of the corona discharge and to avoid flashovers between the collector electrodes in the case of very high air humidity levels.

According to a further aspect of the invention, in order to achieve the abovementioned object a ventilation unit—in particular a ventilation unit for a decentralized living space ventilation system—is proposed having an air duct which is designed for installation in an external wall of a building with an essentially horizontal extent, at least one reversible ventilation means which is arranged in the air duct, and at least one heat reservoir element which is arranged in the air duct. This ventilation unit is distinguished by the fact that at least one electrostatic precipitator, through which the airstream which is to be purified is preferably made to flow, is also arranged in the air duct.

Such a ventilation unit therefore differs from known ventilation units for decentralized living space ventilation systems in respect of the additional at least one electrostatic precipitator which is arranged within the air duct. In order to accommodate these elements on the length of the air duct which is generally limited by the thickness of the wall structure, the elements, in particular heat reservoir elements and electrostatic precipitators, can be interleaved in one another as described above. If sufficient overall length is available, these elements can, however, also be arranged one behind the other without interleaving.

The invention will be explained in more detail below with reference to the exemplary embodiments illustrated in the drawings, in which.

Figure 1:
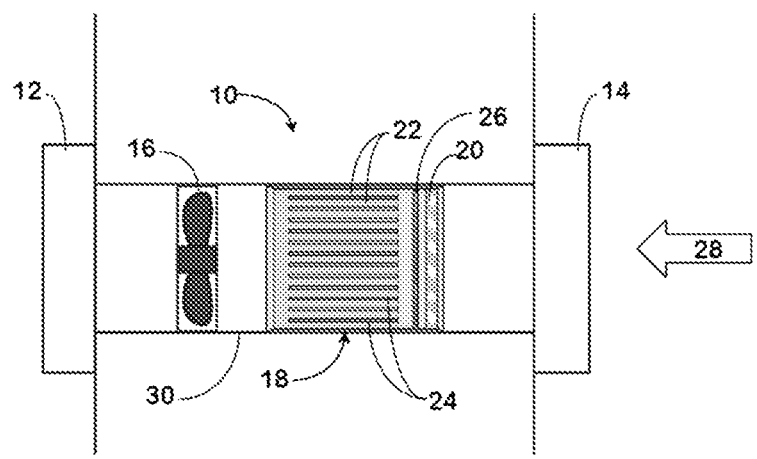
FIG. 1 shows a schematic sectional view through a decentralized living space ventilation unit according to the invention.
Figure 2:
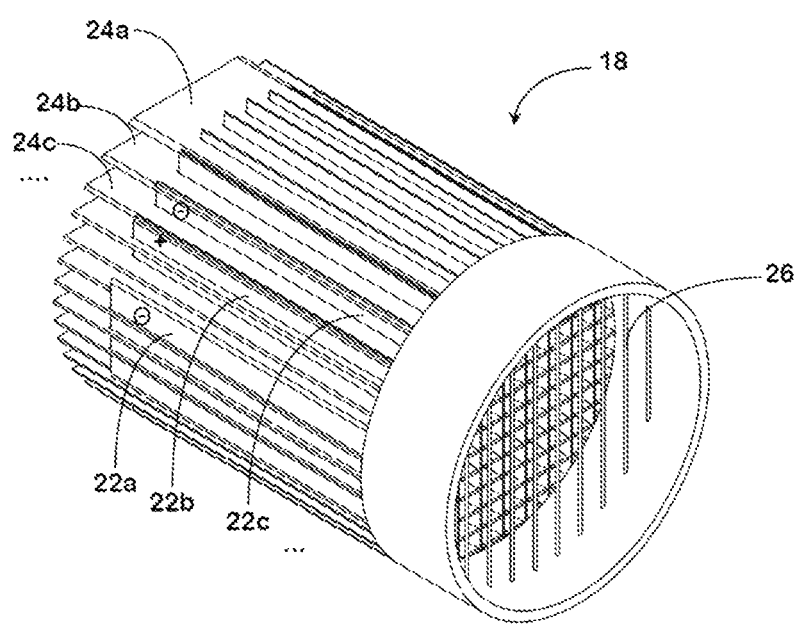
FIG. 2 shows a perspective schematic view of a combined electrostatic precipitator/heat reservoir unit.
Figure 3:
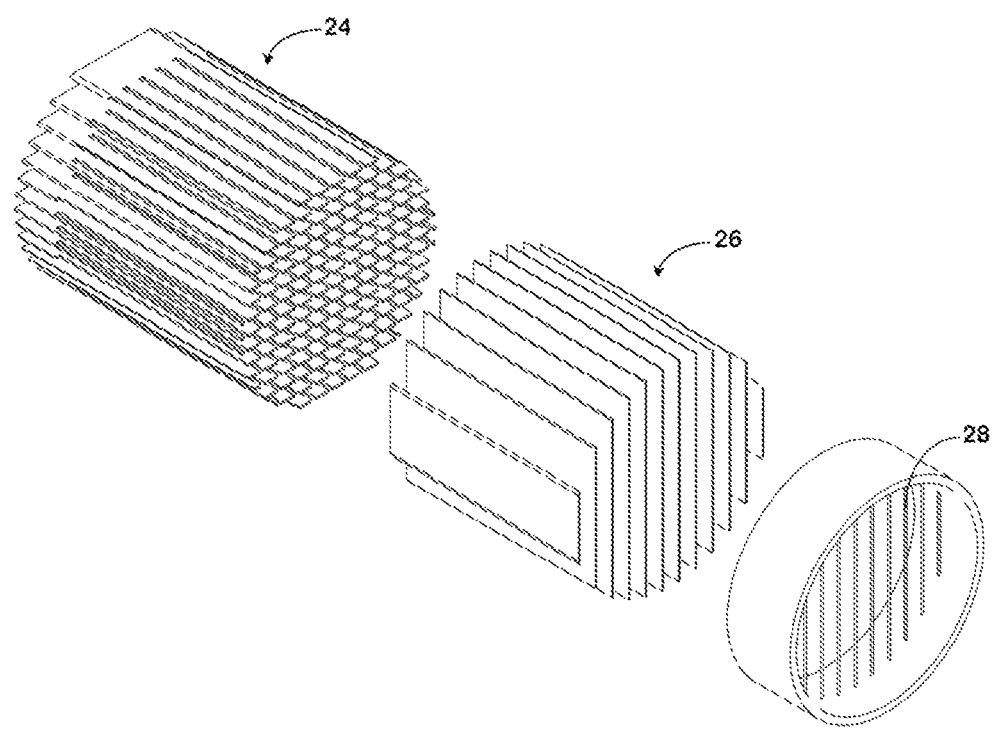
FIG. 3 shows an exploded illustration of FIG. 2.
Figure 4:
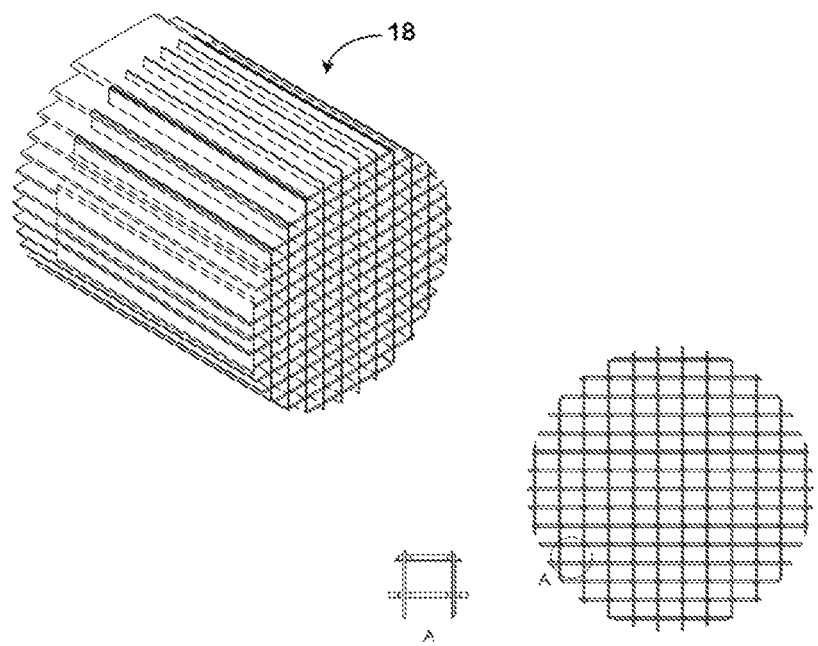
FIG. 4 shows a further illustration of the combined electrostatic precipitator/heat reservoir unit with an illustration of the detail of the air throughput geometry.
Figure 5:
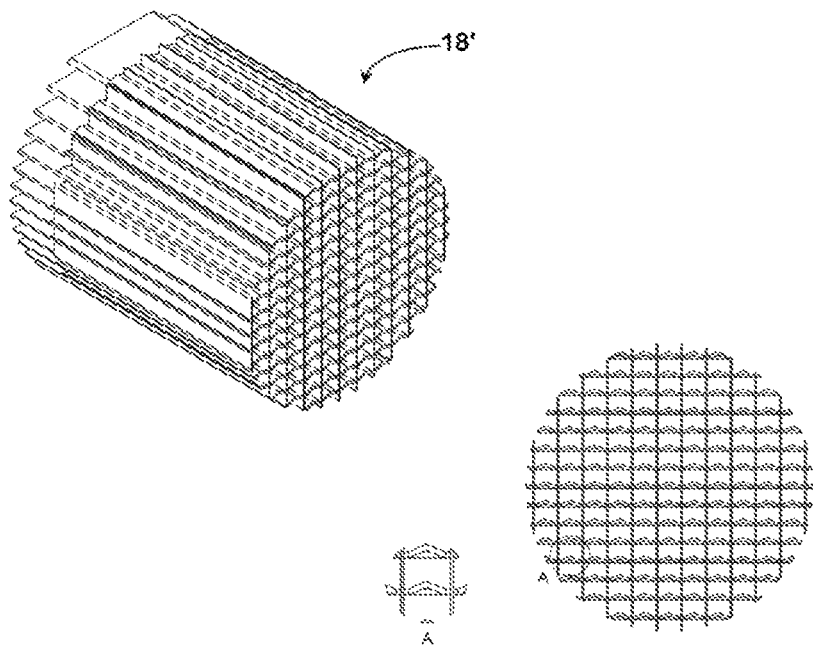
FIG. 5 shows an illustration, analogous to FIG. 4, with an alternative air throughput geometry.

FIG. 1 illustrates a decentralized living space ventilation unit according to the invention which is denoted in its entirety by 10 which connects the outside, located to the right in FIG. 1, of a building via an external panel 14 to an interior space via an internal panel 12 in an air duct 30 which is arranged in a wall breakthrough. An airstream is forcibly generated by means of a reversible axial ventilator 16, with the result that external air 28 can optionally be fed to the inside or internal air to the outside in a known fashion. This takes place as is known respectively in an alternating fashion, preferably in alternation with at least one further living space ventilation unit (not illustrated) with reversed air direction, wherein both living space ventilation units have a flow connection to one another via the interior spaces. The corresponding electronic control units, which are generally microprocessor-controlled and have corresponding user operator control elements are not illustrated. A heat reservoir element 24 ensures recovery of heat, in that it initially heats up (insofar as it is colder outside than inside) as a result of the discharged internal air, and the stored heat is output again to the internal air which is fed in from the outside.

Within the scope of the present invention, this heat reservoir element 24 is interleaved with an electrostatic precipitator to form one common unit 18. The electrostatic precipitator operates in multiple stages according to the Penney principle and is composed of an ionizer 26 which is formed by a wire harp, to which a positive high voltage is applied, and a collector which is connected downstream in the direction of action and which is composed essentially of capacitor plates 24 which are alternatingly positively and negatively charged with high voltage. The corresponding high voltage feed lines and power units are not illustrated. Furthermore, a mechanical pre-filtering means, which is embodied by means of a conventional filter mat 20, is arranged upstream of the electrostatic precipitator.

For maintenance and cleaning purposes, the corresponding components can be pulled out of the wall feedthrough after removal of the internal or external panel 12, 14, wherein the high-voltage supply is preferably connected and disconnected automatically via contact strips and pins (not illustrated). Further details such as voltage feed lines, attachment elements and high-voltage power units are not illustrated individually in the figures.

The interleaving of the electrostatic precipitator and the heat reservoir is illustrated in more detail in FIGS. 2 to 5. According to FIGS. 2 and 3, the planar electrodes 22*a,b,c* etc. of the collector, to which high voltage is respectively applied in an alternating fashion, are arranged vertically in the exemplary embodiment and are penetrated at regular intervals by horizontal comb-like heat reservoir elements 24*a,b,c*. The electrodes 22*a-c* are made shorter than the comb-like heat reservoir elements 24*a-c*, with the result that in the rear area facing away from the ionizer 26 the heat reservoir elements project over the collector electrodes. However, depending on the requirements with respect to discharging of condensate and storage of particles a geometry which is rotated through 90° (vertical heat reservoir elements and horizontal collector electrodes) or a geometry which is rotated through 45° or some other angle or else an entirely different distribution between the electrodes and heat reservoir faces, including integration of the heat reservoir elements into the electrodes, is also conceivable.

Overall, in the exemplary embodiment a cross-grid-shaped structure (cf. also FIG. 4) is produced which is respectively made available in approximately square air ducts. The heat reservoir elements are embodied from an essentially non-conductive plastic material or ceramic material with a high thermal capacitance. In an alternative embodiment according to FIG. 5, the common unit 18' composed of heat reservoir elements and electrostatic precipitator has a shape such that the air passages are in the shape of a roof on their underside (with respect to the mounting position), with the result that better discharge of possibly occurring condensate is ensured.

In an alternative embodiment (not illustrated), the heat reservoir element and the electrostatic precipitator are arranged linearly one behind the other (if appropriate separated from one another by other elements such as a fan) in an air duct which extends through a passage in a wall, but are not interleaved in one another.

The invention claimed is:

1. A filter assembly for a ventilation system, comprising:
   an air duct having an electrostatic precipitator through which an airstream which is to be purified is made to flow and which extends over a predefined section of the air duct,
   wherein at least one heat reservoir element against which the airstream flows is provided in the predefined electrostatic precipitator of the air duct,
   wherein the at least one heat reservoir element and the electrostatic precipitator are interleaved in one another such that the axial extent of the electrostatic precipitator which is interleaved with the at least one heat reservoir element is smaller than the sum of axial extents of a correspondingly powerful separate electrostatic precipitator and axial extents of one or more correspondingly powerful separate heat reservoir elements.

2. The filter assembly as claimed in claim 1, wherein the at least one heat reservoir element is fabricated from a material which is not electrically conductive or is a poor electrical conductor.

3. The filter assembly as claimed in claim 1, wherein the at least one heat reservoir element has an overall mass which is at least as large as 50%, preferably at least 100%, of the mass of components which are technically necessary for the electrostatic precipitator.

4. The filter assembly as claimed in claim 1, wherein the at least one heat reservoir element is manufactured essentially from a material with a high thermal conductance and high heat storage capacity, wherein the material is a plastic material or a ceramic material.

5. The filter assembly as claimed in claim 1, wherein the electrostatic precipitator is a two-stage electrostatic precipitator with an ionizer and a collector.

6. The filter assembly as claimed in one claim 1, wherein the at least one heat reservoir element is embodied in a comb-like fashion, wherein individual teeth of the at least one comb-like element preferably project into intermediate spaces between collector electrodes of the electrostatic precipitator.

7. A decentralized living space ventilation system comprising:
   the filter assembly of claim 1;
   at least one electric fan connected upstream or downstream of the filter assembly controlled by a controller, the at least one electric fan operating in a reversing fashion in a normal operating mode of the living space ventilation system, wherein, when there is a temperature difference between the inside and the outside heat, recovery can be achieved with the at least one heat reservoir element.

8. The decentralized living space ventilation system as claimed in claim 7, wherein the electrostatic precipitator primarily filters the air flowing into an interior space in an inflow air operating mode, and the electrostatic precipitator includes an ionizer that is supplied with voltage only in an inflow air operating mode of the living space ventilation system and is switched off in an outflow air operating mode.

9. The decentralized living space ventilation system as claimed in claim 7, wherein the controller has a purification mode which is actuated periodically and/or can be actuated manually and in which, when the electrostatic precipitator is switched off, air is blown outward with a maximum power, and/or in that a mechanical actuator is provided for periodically dislodging precipitated particles.

10. The decentralized living space ventilation system as claimed in claim 7, wherein the operating voltage of the electrostatic precipitator, including the operating voltage of an ionizer and the operating voltage of a collector can be varied as a function of various parameters, wherein these parameters can be selected from at least one of air feed direction, air throughput rate, operating level, calendar date and time, internal temperature, external temperature, air humidity, location-dependent fine dust values which are transmitted via a network, a predefinition for the prevailing average particle size (country mode/town mode) or a signal of a dust resistance sensor.

11. A ventilation unit, comprising:
   an air duct designed for installation in an external wall of a building with an essentially horizontal extent, at least one reversible ventilation means arranged in the air duct, and at least one heat reservoir element arranged in the air duct,
   wherein at least one electrostatic precipitator is also arranged in the air duct,
   wherein the at least one heat reservoir element and an electrostatic precipitator are interleaved in one another such that the axial extent of the at least one electrostatic precipitator which is interleaved with the at least one heat reservoir element is smaller than the sum of axial extents of a correspondingly powerful electrostatic precipitator and axial extents of one or more correspondingly powerful separate heat reservoir elements.

12. The ventilation unit as claimed in claim 11, further comprising:

an air duct having the electrostatic precipitator through which an airstream which is to be purified is made to flow and which extends over a predefined section of the air duct, wherein at least one heat reservoir element against which the airstream flows is provided in the predefined electrostatic precipitator of the air duct.

13. A filter assembly for a ventilation system, comprising:

an air duct having an electrostatic precipitator through which an airstream which is to be purified is made to flow and which extends over a predefined section of the air duct, wherein at least one heat reservoir element against which the airstream flows is provided in the predefined electrostatic precipitator of the air duct, wherein the at least one heat reservoir element is embodied in a comb-like fashion, wherein individual teeth of the at least one comb-like element preferably project into intermediate spaces between collector electrodes of the electrostatic precipitator.

* * * * *